(12) United States Patent
Kainuma et al.

(10) Patent No.: US 7,234,483 B2
(45) Date of Patent: Jun. 26, 2007

(54) ELECTRO-PNEUMATIC AIR PRESSURE REGULATOR

(75) Inventors: Masakuni Kainuma, Saitama-ken (JP);
Toshikazu Aoki, Saitama-ken (JP);
Keiji Tamaki, Saitama-ken (JP);
Katsuo Uematsu, Saitama-ken (JP);
Tomomasa Fujita, Saitama-ken (JP);
Hiroshi Chinda, Saitama-ken (JP);
Akihiro Hayashi, Saitama-ken (JP);
Mitsuaki Nakanishi, Saitama-ken (JP)

(73) Assignee: Fujikura Rubber Ltd., Tokyo (JP)

( * ) Notice: Subject to any disclaimer, the term of this patent is extended or adjusted under 35 U.S.C. 154(b) by 226 days.

(21) Appl. No.: 10/859,028

(22) Filed: Jun. 2, 2004

(65) Prior Publication Data

US 2004/0244834 A1   Dec. 9, 2004

(30) Foreign Application Priority Data

Jun. 4, 2003   (JP) ............................. 2003-158753

(51) Int. Cl.
*F15B 13/044* (2006.01)
*G05D 16/06* (2006.01)

(52) U.S. Cl. .................. 137/85; 137/489; 251/30.01; 251/333

(58) Field of Classification Search .................. 137/85, 137/116.5, 495, 489; 251/333, 903, 30.01
See application file for complete search history.

(56) References Cited

U.S. PATENT DOCUMENTS 3,645,293 A * 2/1972 Pedersen ............... 137/861
4,722,360 A   2/1988 Odajima et al.
4,848,726 A * 7/1989 Hary ................ 251/129.02

(Continued)

FOREIGN PATENT DOCUMENTS

DE   1254421   11/1967

(Continued)

OTHER PUBLICATIONS

Kagawa, Toshiharu; Hanatsuka, Katsumi and Morinaga, Tomoaki; Input-Output and Outplut Flow Rate Static Characteristics of Non-Bleed Type Pneumatic Pilot Valve; pp. 125-131; Japan.

(Continued)

*Primary Examiner*—Ramesh Krishnamurthy
(74) *Attorney, Agent, or Firm*—McCormick, Paulding & Huber LLP

(57) ABSTRACT

An electro-pneumatic air pressure regulator includes a primary pressure introduction port, a secondary pressure output port, a pilot pressure chamber, a main valve for opening and closing a communicating conduit, a floating piston which actuates the main valve, a nozzle conduit via which the pilot pressure chamber is communicatively connected to the atmosphere, a flapper which includes a leaf spring facing an open end of the nozzle conduit, and an electromagnetic drive system which deforms the leaf spring to vary a position of the flapper relative to the open end of the nozzle conduit in accordance with the magnitude of an analogue input signal. The flapper includes a conical projection which projects toward the open end of the nozzle conduit. A conical recess corresponding to the conical projection is formed on an end face of the nozzle conduit around the open end thereof.

6 Claims, 4 Drawing Sheets

U.S. PATENT DOCUMENTS

| | | | | |
|---|---|---|---|---|
| 5,906,218 A | * | 5/1999 | Carey | 137/82 |
| 6,079,435 A | * | 6/2000 | Franz et al. | 137/82 |
| 2002/0179874 A1 | * | 12/2002 | Hofmann et al. | 251/129.15 |

FOREIGN PATENT DOCUMENTS

| | | |
|---|---|---|
| DE | 1523486 | 1/1970 |
| EP | 0508357 | 10/1992 |
| FR | 1159240 | 6/1958 |
| GB | 1143855 | 2/1969 |

OTHER PUBLICATIONS

European Search Report No. 04 01 2797 dated Jul. 8, 2005.

* cited by examiner

Prior Art

ELECTRO-PNEUMATIC AIR PRESSURE REGULATOR

CROSS REFERENCE TO RELATED APPLICATION

The present application is related to and claims priority of the following co-pending application, namely, Japanese patent application number 2003-158753 filed on Jun. 4, 2003. The above-identified application is incorporated herein by reference in its entirety.

BACKGROUND OF THE INVENTION

1. Field of the Invention

The present invention relates to an electro-pneumatic air pressure regulator which regulates output air pressure in accordance with the magnitude of an analogue input signal (the amount of input electricity).

2. Description of the Related Art

A conventional electro-pneumatic air pressure regulator which includes: a primary pressure (valve-inlet pressure) introduction port; a secondary pressure (valve-outlet pressure) output port; a main valve for opening and closing a communicating conduit via which a primary pressure introduction port and a secondary pressure output port are communicatively connected with each other; a floating piston which moves in accordance with the difference in pressure between the secondary pressure output port and the pilot pressure chamber to open and close the main valve and to release air in the secondary pressure output chamber to the atmosphere; a nozzle conduit via which the pilot pressure chamber is communicatively connected to the atmosphere; a flapper which includes a resilient leaf spring facing an open end of the nozzle conduit; and an electromagnetic drive system which varies the position of the flapper relative to the open end of the nozzle conduit in accordance with the magnitude of an analogue input signal (e.g., electricity), is known in the art.

In this conventional electro-pneumatic air pressure regulator, if a flow path area of a communicating passage between the pilot pressure chamber and atmosphere is constant, a movement of the floating piston toward the secondary pressure output port by a variation in the secondary pressure causes the main valve to open the communicating passage, via which the primary pressure introduction port and the secondary pressure output port are communicatively connected with each other, so that the air in the primary pressure introduction port flows into the secondary pressure output port to thereby increase the pressure in the secondary pressure output port. On the other hand, a movement of the floating piston toward the pilot pressure chamber causes the air in the secondary pressure output port to flow out to the atmosphere to thereby decrease the pressure in the secondary pressure output port. These operations of the electro-pneumatic air pressure regulator maintain the pressure in the secondary pressure output port substantially constant.

On the other hand, if the amount of electricity supplied to the electromagnetic drive system is changed, the leaf spring of the flapper is resiliently deformed in accordance with the amount of electricity supplied to the electromagnetic drive system. This deformation of the leaf spring causes the distance between the flapper and the open end of the nozzle conduit to vary, thus causing a flow path area of a communicating passage between the pilot pressure chamber and atmosphere to vary. As a result, the amount of the air flow from the pilot pressure chamber to the atmosphere varies to thereby vary the pressure in the pilot pressure chamber. Accordingly, the pressure chamber in the secondary pressure output port can be adjusted by changing the amount of electricity supplied to the electromagnetic drive system.

In this conventional electro-pneumatic air pressure regulator, a further improvement in resolving power (the ratio of the variation in the amount of control current (amount of electricity) to the variation of the secondary pressure) is required.

SUMMARY OF THE INVENTION

The present invention provides an electro-pneumatic air pressure regulator having highly-improved resolving power.

According to an aspect of the present invention, an electro-pneumatic air pressure regulator is provided, including a primary pressure introduction port, a secondary pressure output port, a pilot pressure chamber, a main valve for opening and closing a communicating conduit via which the primary pressure introduction port and the secondary pressure output port are communicatively connected with each other, a floating piston which moves in accordance with a difference in pressure between the secondary pressure output port and the pilot pressure chamber to actuate the main valve, a nozzle conduit via which the pilot pressure chamber is communicatively connected to the atmosphere, a flapper which includes a leaf spring facing an open end of the nozzle conduit, and an electromagnetic drive system which deforms the leaf spring to vary a position of the flapper relative to the open end of the nozzle conduit in accordance with the magnitude of an analogue input signal. The flapper includes a conical projection which projects toward the open end of the nozzle conduit. A conical recess corresponding to the conical projection is formed on an end face of the nozzle conduit around the open end thereof.

If an air flow path area is defined by the distance between opposed surfaces of the conical protrusion and the conical recess, a variation of the air flow path area per unit of movement of the flapper can be decreased to improve resolving power of the electro-pneumatic air pressure regulator.

The conical projection can be formed on the flapper in any manner of formation. For instance, the flapper can includes a coil bobbin on which a coil of the electromagnetic drive system is wound, and a self-fixing pin by which the leaf spring and the coil bobbin are fixed to each other, wherein the conical projection is formed on the self-fixing pin.

It is desirable for an upper shock-absorbing ring and a lower shock-absorbing ring to be positioned on an upper surface and a lower surface of a periphery of the leaf spring, respectively, the periphery of the leaf spring being sandwiched between the upper shock-absorbing ring and the lower shock-absorbing ring to improve vibration resistance of the electro-pneumatic air pressure regulator.

The pilot pressure chamber can be formed with a diaphragm which serves as an element of the floating piston, the pilot pressure chamber being communicatively connected with the secondary pressure output port.

It is desirable for the pilot pressure chamber to be formed between a second diaphragm, serving as an element of the floating piston, and a housing of the electro-pneumatic air pressure regulator. The nozzle conduit is formed on the housing to penetrate therethrough.

It is desirable for the leaf spring to be in the shape of a disk, the coil bobbin being fixed to a center of the disk-shaped leaf spring by the self-fixing pin.

BRIEF DESCRIPTION OF THE DRAWINGS

The present invention will be described below in detail with reference to the accompanying drawings in which.

DESCRIPTION OF THE PREFERRED EMBODIMENT

Figure 1:
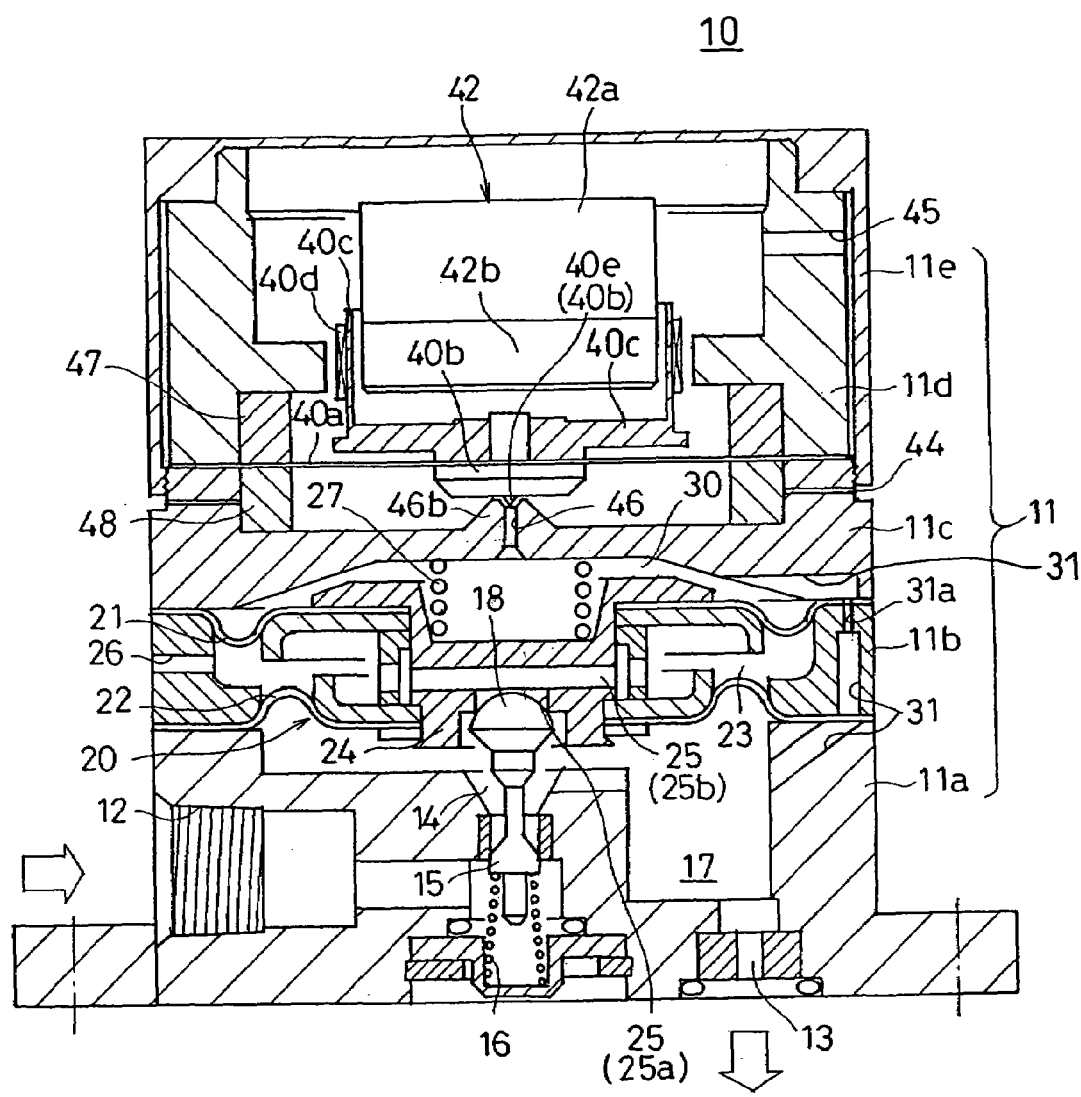
FIG. 1 is a longitudinal cross sectional view of an embodiment of an electro-pneumatic air pressure regulator according to the present invention.
Figure 2:
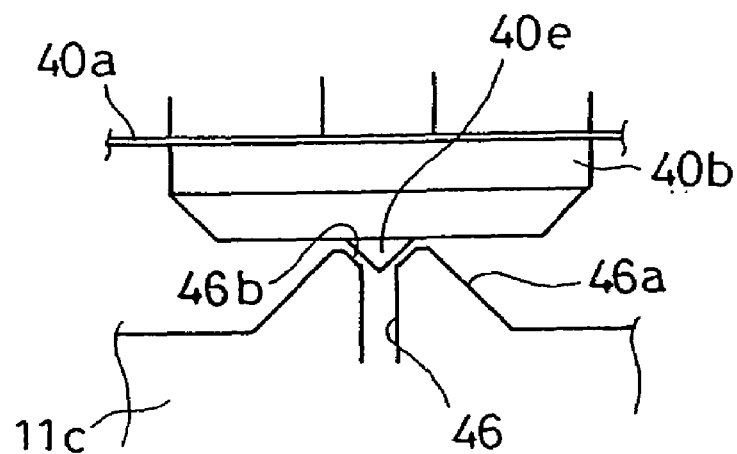
FIG. 2 is an enlarged view of a portion of the electro-pneumatic air pressure regulator shown in FIG. 1.
Figure 3:
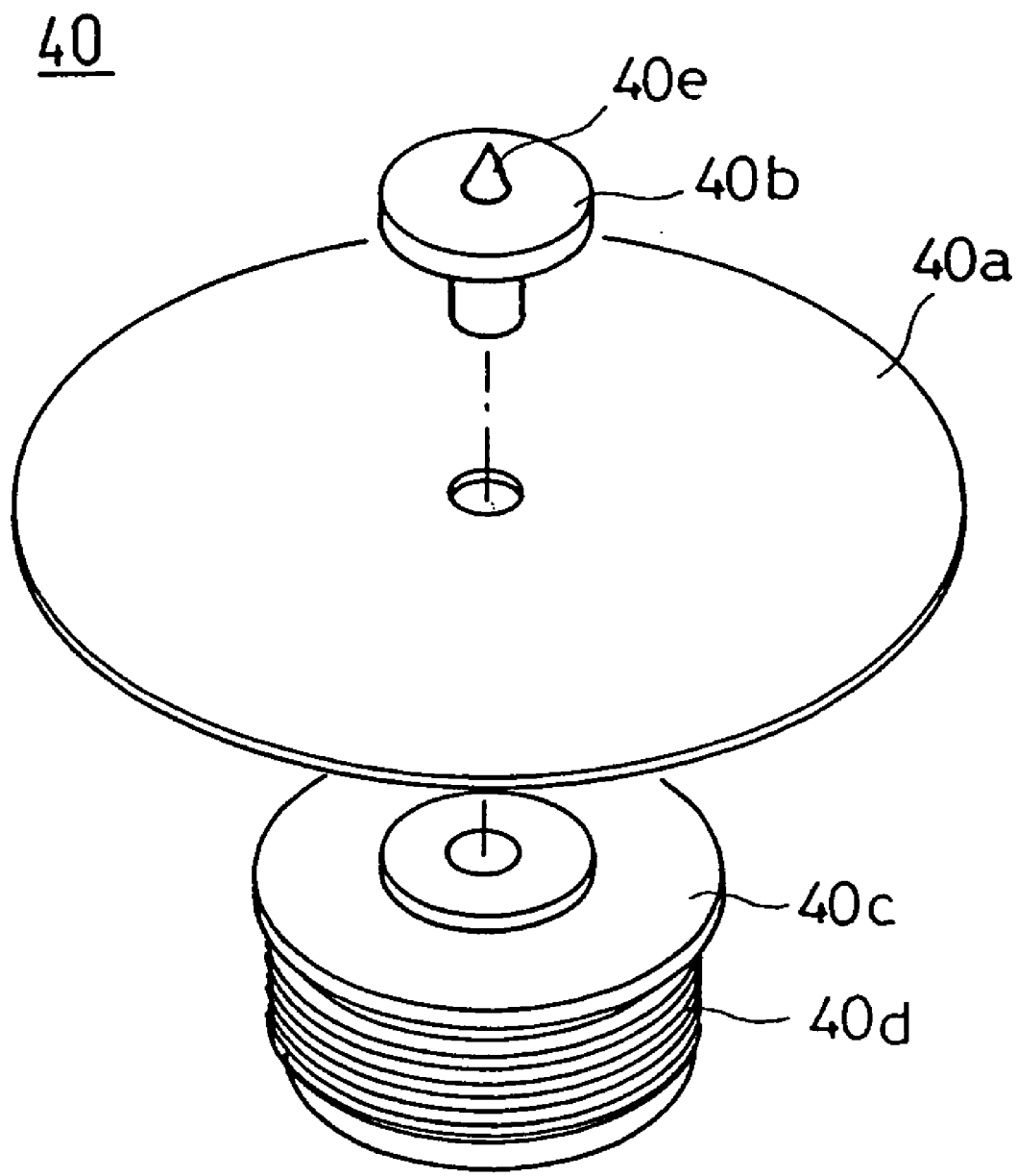
FIG. 3 is an exploded perspective view of a flapper of the electro-pneumatic air pressure regulator shown in FIG. 1, viewed obliquely from below.

FIGS. 1 through 3 show an embodiment of an electro-pneumatic air pressure regulator according to the present invention. The electro-pneumatic air pressure regulator 10 is provided with a housing 11 including a lower housing 11a, a middle housing 11b, a first upper housing 11c, a second upper housing 11d and a cap body 11e, in that order from bottom to top as viewed in FIG. 1.

The lower housing 11a is provided with a primary pressure (valve-inlet pressure) introduction port 12 and a secondary pressure (valve-outlet pressure) output port 13. The lower housing 11a is provided between the primary pressure introduction port 12 and the secondary pressure output port 13 with a communicating conduit 14, via which the primary pressure introduction port 12 and the secondary pressure output port 13 are communicatively connected with each other. The communicating conduit 14 is opened and closed by a main valve 15. The main valve 15 is normally closed by the spring force of a compression coil spring 16. The lower housing 11a is provided therein with a secondary pressure output chamber 17 which is communicatively connected to both the secondary pressure output port 13 and the communicating conduit 14.

The electro-pneumatic air pressure regulator 10 is provided between the first upper housing 11c and the lower housing 11a with a floating piston 20 having a pilot diaphragm 21 and a control diaphragm (flexible diaphragm member) 22. The outer edge of the pilot diaphragm 21 is sandwiched between the upper housing 11c and the middle housing 11b in an air-tight fashion, while the outer edge of the control diaphragm 22 is sandwiched between the middle housing 11b and the lower housing 11a in an air-tight fashion. The floating piston 20 is provided between the pilot diaphragm 21 and the control diaphragm 22 with a relief chamber 23, and is provided at a center of the floating piston 20 with a relief valve seat 24. The relief valve seat 24 is provided with a communicating hole 25 via which the secondary pressure output chamber 17 and the relief chamber 23 are communicatively connected with each other. The relief camber 23 is communicatively connected to the atmosphere through an atmosphere communicating hole 26 which penetrates through the middle housing 11b. The floating piston 20 forms the secondary pressure output chamber 17 in the lower housing 11a.

The communicating hole 25 includes an axial conduit 25a and a radial conduit 25b. The axial conduit 25a is closed by a relief valve 18 which is formed integral with the main valve 15. Accordingly, no air in the secondary pressure output chamber 17 flows into the relief chamber 23 when the communicating hole 25 is closed by the relief valve 18, whereas air in the secondary pressure output chamber 17 is exposed (released) to the atmosphere through the communicating hole 25, the relief chamber 23 and the atmosphere communicating hole 26 when the main valve 15 (the relief valve 18) and the floating piston 20 relatively move apart from each other so that the relief valve 18 opens the axial conduit 25a. The floating piston 20 is continuously biased downward as viewed in FIG. 1, i.e. in a direction to close the axial conduit 25a by contact of the communicating hole 25 (the axial conduit 25a) of the relief valve seat 24 with the relief valve 18, by a compression coil spring 27 which is installed between the first upper housing 11c and the floating piston 20.

The electro-pneumatic air pressure regulator 10 is provided between the first upper housing 11c and the floating piston 20 with a pilot pressure chamber 30. An internal-housing communicating conduit 31 for communicatively connecting the pilot pressure chamber 30 to the secondary pressure output chamber 17 penetrates through the lower housing 11a, the middle housing 11b and the first upper housing 11c. A portion of the internal-housing communicating conduit 31 is formed as an orifice 31a through which a desired pressure is produced in the pilot pressure chamber 30 by the pressure in the secondary pressure output chamber 17.

With the above described structure, a sudden rise in pressure at the secondary pressure output port 13 (the pressure in the secondary pressure output chamber 17) to a degree so as to raise the floating piston 20 against the spring force of the compression coil spring 27 causes the axial conduit 25a to be disengaged from the relief valve 18 to release the air in the secondary pressure output chamber 17 into the atmosphere. Namely, the pressure in the secondary pressure output chamber 17 drops after a sudden rise in pressure in the pressure in the secondary pressure output chamber 17 occurs. Conversely, a sudden drop in pressure in the secondary pressure output chamber 17 to an extent so as to make a downward force by the pilot diaphragm 21 and the compression coil spring 27 greater than an upward force by the control diaphragm 22 causes the floating piston 20 to descend to thereby move the main valve 15 downward against the spring force of the compression coil spring 16 via the relief valve 18 to open the communicating conduit 14. Consequently, the primary pressure in the primary pressure introduction port 12 is introduced into the secondary pressure output chamber 17 (the secondary pressure output port 13), so that the pressure in the secondary pressure output chamber 17 (the secondary pressure output port 13) increases. Accordingly, the floating piston 20 moves in accordance with the difference in pressure between the secondary pressure output port 13 and the pilot pressure chamber 30 to actuate (open and close) the main valve 15. A repetition of the above described operations in accordance with variations of the pressure in the secondary pressure output chamber 17 makes it possible to produce a constant secondary pressure (valve-output pressure) in the secondary pressure output port 13 regardless of the primary pressure (valve-inlet pressure) in the primary pressure introduction port 12.

The electro-pneumatic air pressure regulator 10 is provided between the first upper housing 11c and the second upper housing 11d with a flapper 40 which is supported therebetween. The flapper 40 is provided with a resilient disk-shaped leaf spring 40a, a bottomed coil bobbin 40c and a coil (moving coil) 40d. The bottomed coil bobbin 40c is fixed to a central portion of the leaf spring 40a via a self-locking pin 40b. The coil 40d is wound on a cylindrical portion of the bottomed coil bobbin 40c. The outer edge of the disk-shaped leaf spring 40a is held tight (sandwiched) between the first upper housing 11c and the second upper housing 11d to be fixed thereto.

The electro-pneumatic air pressure regulator 10 is provided radially inside the second upper housing 11d with a cylindrical permanent magnet assembly 42 which is supported on an axial portion of the second upper housing 11d. The permanent magnet assembly 42 is provided with a permanent magnet 42a and a yoke 42b which are positioned coaxially with the coil bobbin 40c of the flapper 40. The yoke 42b is positioned immediately below the permanent magnet 42a to face the coil bobbin 40c while having a gap between the yoke 42b and the coil bobbin 40c. The coil 40d and the permanent magnet assembly 42 constitute an electromagnetic drive system which resiliently deforms the disk-shaped leaf spring 40a of the flapper 40. The first upper housing 11c and the second upper housing 11d are provided with atmosphere communicating holes 44 and 45, respectively, for communicatively connecting a chamber in which the permanent magnet assembly 42 and the flapper 40 are accommodated to the atmosphere.

The first upper housing 11c is provided, on an axis thereof at the center of the flapper 40, with a nozzle conduit 46 via which the pilot pressure chamber 30 and the space between the disk-shaped leaf spring 40a and the first upper housing 11c (which is communicatively connected to the atmosphere through the atmosphere communicating hole 44) are communicatively connected to each other. The first upper housing 11c is provided, on an upper central portion thereof which faces the flapper 40 with a conical projecting portion 46a. As shown in FIG. 2, the conical projecting portion 46a is provided, at an open end of the nozzle conduit 46 adjacent to the flapper 40 (the upper open end of the nozzle conduit 46 as viewed in FIG. 2), with a conical recess 46b, while the self-locking pin 40b is provided, on the head thereof which faces the conical recess 46b, with a corresponding conical projection 40e. The conical recess 46b can be said to be formed at an end face (the upper end face as viewed in FIG. 2) of the nozzle conduit 46 around the upper end thereof. FIG. 3 is an exploded perspective view of the flapper 40, viewed obliquely from below. The self-locking pin 40b serves to fix a circular bottom center of the bottomed coil bobbin 40c to the central portion of the disk-shaped leaf spring 40a by swaging a part of the self-locking pin 40b, and has the conical projection 40e that is formed integral with the head of the self-locking pin 40b. The axis of the conical recess 46b, which is formed to correspond to the conical projection 40e, and the axis of the nozzle conduit 46 are precisely aligned. In addition, the shape of the conical recess 46b and the shape of the conical projection 40e precisely correspond to each other, and the surfaces of the conical recess 46b and the conical projection 40e are treated and finished with a minimum surface irregularity.

The electro-pneumatic air pressure regulator 10 is provided on upper and lower surfaces of a periphery of the disk-shaped leaf spring 40a with an upper shock-absorbing ring 47 and a lower shock-absorbing ring 48, respectively, which are made of an elastic material such as rubber. The upper shock-absorbing ring 47 and the lower shock-absorbing ring 48 are held tight between the first upper housing 11c and the second upper housing 11d while holding a periphery of the disk-shaped leaf spring 40a between the upper shock-absorbing ring 47 and the lower shock-absorbing ring 48. The upper shock-absorbing ring 47 and the lower shock-absorbing ring 48 operate to lessen deformation of the disk-shaped leaf spring 40a to improve vibration resistance of the electro-pneumatic air pressure regulator 10.

In the electro-pneumatic air pressure regulator 10 that has the above described structure, supplying a forward current and a reverse current to the coil 40d, causes the flapper 40 (the disk-shaped leaf spring 40a) to be resiliently deformed to move upward and downward, respectively, due to electromagnetic action between the electromagnetic drive system 42 and the coil 40d. The distance between opposed surfaces of the conical projection 40e and the conical recess 46b varies when the flapper 40 moves up and down. The amount of variation of the distance between opposed surfaces of the conical projection 40e and the conical recess 46b is proportional to the magnitude of the current or the voltage (analogue electrical input signal) supplied to the coil 40d. The amount of the air escaping from the pilot pressure chamber 30 increases and decreases as the distance between opposed surfaces of the conical projection 40e and the conical recess 46b increases and decreases, respectively. Therefore, the secondary pressure in the secondary pressure output port 13 can be adjusted by changing the magnitude of the current supplied to the coil 40d.

According to the above described embodiment of the electro-pneumatic air pressure regulator 10, a variation of the air flow path area per unit of movement of the flapper 40 can be decreased to improve resolving power of the electro-pneumatic air pressure regulator 10 since the air flow path area is determined by the distance between opposed surfaces of the conical projection 40e and the conical recess 46b.

Figure 5:
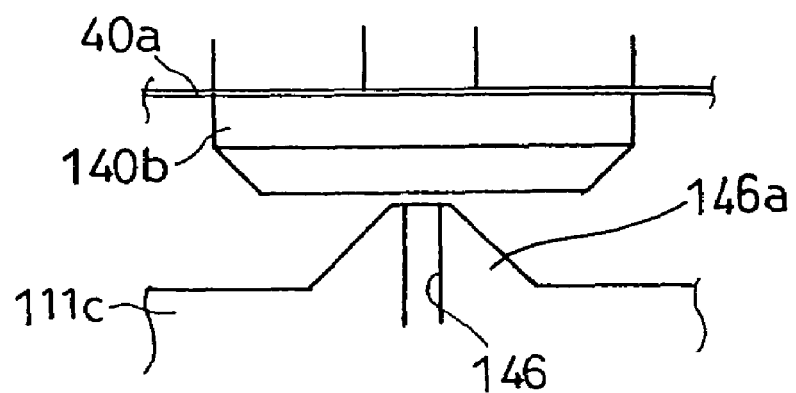
FIG. 5 is a view similar to that of FIG. 2, showing a portion of a conventional electro-pneumatic air pressure regulator.

FIG. 5 is a longitudinal cross sectional view of a portion of a conventional electro-pneumatic air pressure regulator which is compared with the portion of the electro-pneumatic air pressure regulator 10 shown in FIG. 2. As shown in FIG. 5, a self-fixing pin 140b (which corresponds to the self-fixing pin 40b) has a flat head (i.e., the self-fixing pin 140b is provided on the head thereof with no conical projection corresponding to the conical projection 40e), while an end surface of a conical projecting portion 146a (which corresponds to the conical projecting portion 46a) around an upper open end of the nozzle conduit 146 (which corresponds to the nozzle 46) adjacent to the flat head of the self-fixing pin 140b, is formed as a flat end surface. Accordingly, a sufficient resolving power of the electro-pneumatic air pressure regulator cannot be achieved in the conventional electro-pneumatic air pressure regulator shown in FIG. 5.

Figure 4:
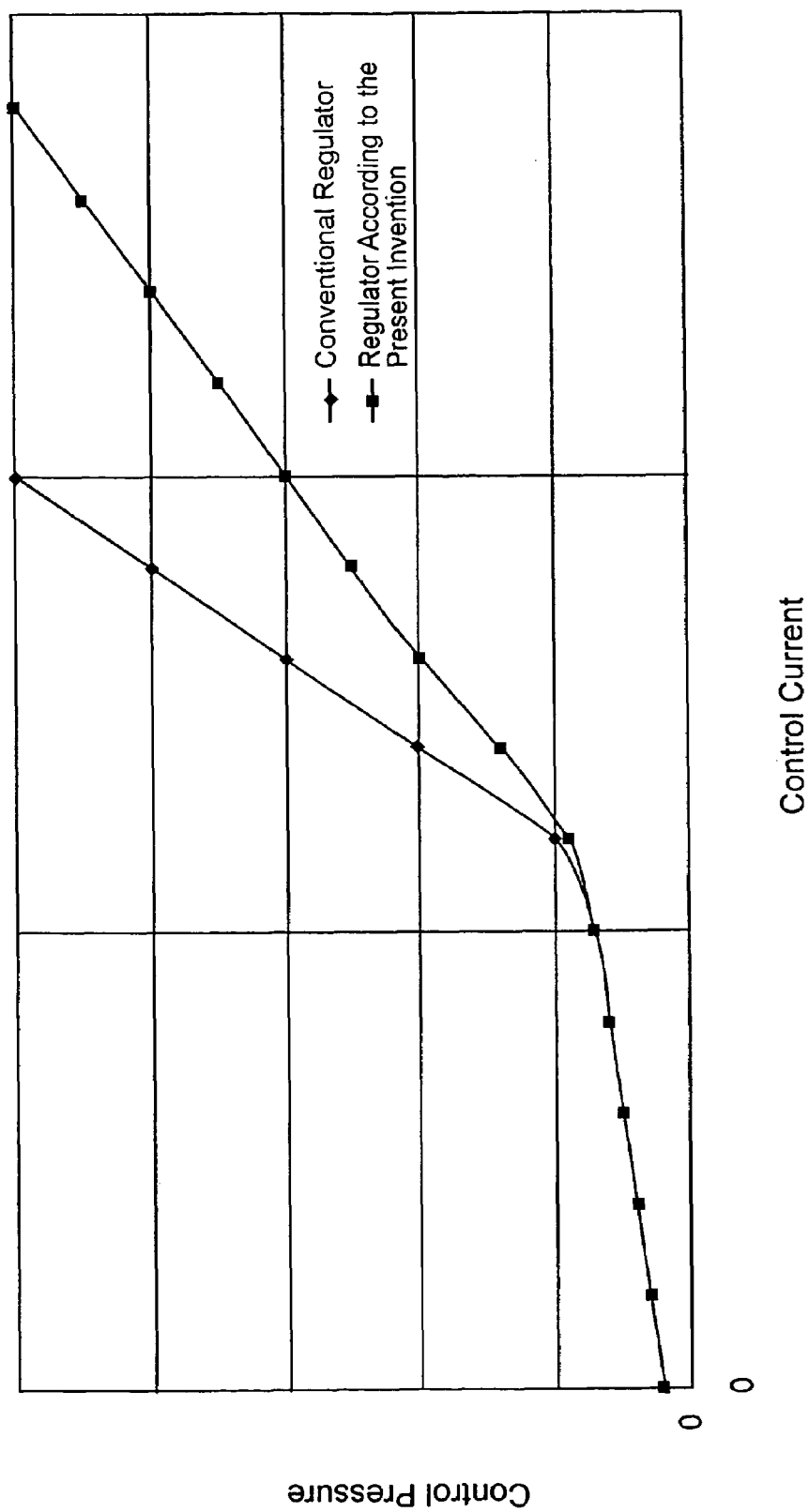
FIG. 4 is a graph showing a comparative example of the control resolving power of a conventional electro-pneumatic air pressure regulator and the control resolving power of the electro-pneumatic air pressure regulator according to the present invention.

FIG. 4 is a graph showing a comparative example of a control resolving power of a conventional electro-pneumatic air pressure regulator which has the structure shown in FIG. 5 and a control resolving power of the electro-pneumatic air pressure regulator 10 that has the structure shown in FIG. 2 (according to the present invention), wherein these two electro-pneumatic air pressure regulators are identical to each other except for the difference in structure between the head of the self-fixing pin 40b (shown in FIG. 2) and the head of the self-fixing pin 140b (shown in FIG. 5) and the difference in structure between the conical projection 40e (shown in FIG. 2) and the conical projection 140e (shown in FIG. 5). The horizontal axis represents a control current which is supplied to the coil 40d, and the vertical axis represents a control pressure (secondary pressure) which is output from the secondary pressure output port 13. Substantially no difference is recognized between the present embodiment of the electro-pneumatic air pressure regulator 10 (having the structure shown in FIG. 2) and the conventional electro-pneumatic air pressure regulator (having the structure shown in FIG. 5) when the control current is small (i.e., as long as the distance between the self-fixing pin (40b or 140b) and the associated end opening of the communicating conduit (46 or 146) is great). However, it can be easily recognized from FIG. 4 that resolving power (the ratio of the variation in the amount of control current to the variation of the secondary pressure) of the present embodiment of the electro-pneumatic air pressure regulator exceeds that of the conventional electro-pneumatic air pressure regulator as the control current increases.

Although the conical projection 40e is formed integral with the head of the self-fixing pin 40b of the flapper 40 in the above illustrated embodiment of the electro-pneumatic air pressure regulator, it is possible that a conical projection corresponding to the conical projection 40e be fixed to the disk-shaped leaf spring 40a depending on the structure of the flapper 40.

As can be understood from the foregoing, according to the present invention, an electro-pneumatic air pressure regulator having highly-improved resolving power is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An electro-pneumatic air pressure regulator comprising:
    a primary pressure introduction port;
    a secondary pressure output port;
    a pilot pressure chamber;
    a main valve for opening and closing a communicating conduit via which said primary pressure introduction port and said secondary pressure output port are communicatively connected with each other;
    a floating piston which moves in accordance with a difference in pressure between said secondary pressure output port and said pilot pressure chamber to actuate said main valve;
    a nozzle conduit via which said pilot pressure chamber is communicatively connected to the atmosphere;
    a flapper which includes a leaf spring facing an open end of said nozzle conduit; and
    an electromagnetic drive system which deforms said leaf spring to vary a position of said flapper relative to said open end of said nozzle conduit in accordance with the magnitude of an analogue input signal,
    wherein said flapper includes a conical projection which projects toward said open end of said nozzle conduit, and
    wherein a conical recess corresponding to said conical projection is formed on an end face of said nozzle conduit around said open end thereof.

2. The electro-pneumatic air pressure regulator according to claim 1, wherein said flapper comprises:
    a coil bobbin on which a coil of said electromagnetic drive system is wound; and
    a self-fixing pin by which said leaf spring and said coil bobbin are fixed to each other,
    wherein said conical projection is formed on said self-fixing pin.

3. The electro-pneumatic air pressure regulator according to claim 1, further comprising an upper shock-absorbing ring and a lower shock-absorbing ring which are positioned on an upper surface and a lower surface of a periphery of said leaf spring, respectively, said periphery of said leaf spring being sandwiched between said upper shock-absorbing ring and said lower shock-absorbing ring.

4. The electro-pneumatic air pressure regulator according to claim 1, wherein said pilot pressure chamber is formed with a diaphragm which serves as an element of said floating piston, said pilot pressure chamber being communicatively connected with said secondary pressure output port.

5. The electro-pneumatic air pressure regulator according to claim 4, wherein said pilot pressure chamber is formed between a second diaphragm, serving as an element of said floating piston, and a housing of said electro-pneumatic air pressure regulator,
    wherein said nozzle conduit is formed on said housing to penetrate therethrough.

6. The electro-pneumatic air pressure regulator according to claim 2, wherein said leaf spring is in the shape of a disk, said coil bobbin being fixed to a center of said disk-shaped leaf spring by said self-fixing pin.

* * * * *